United States Patent
Sarkar et al.

(10) Patent No.: US 11,057,444 B1
(45) Date of Patent: Jul. 6, 2021

(54) SYSTEMS AND METHODS FOR SHARED BROADCASTING

(71) Applicant: Facebook, Inc., Menlo Park, CA (US)

(72) Inventors: Shilpa Sarkar, San Francisco, CA (US); Mari Sheibley, San Francisco, CA (US); Lu D. Chen, Menlo Park, CA (US); Udeepta Dutta Bordoloi, Foster City, CA (US); Sergii Demianov, San Mateo, CA (US); Jaed Uavechanichkul, San Francisco, CA (US); David Chiles, Redwood City, CA (US); Hai Wang, Foster City, CA (US)

(73) Assignee: Facebook, Inc., Menlo Park, CA (US)

( * ) Notice: Subject to any disclaimer, the term of this patent is extended or adjusted under 35 U.S.C. 154(b) by 161 days.

(21) Appl. No.: 15/940,101

(22) Filed: Mar. 29, 2018

(51) Int. Cl.
  *G06F 15/16* (2006.01)
  *H04L 29/06* (2006.01)
  *H04L 12/58* (2006.01)
  *H04L 29/08* (2006.01)

(52) U.S. Cl.
  CPC .......... *H04L 65/4076* (2013.01); *H04L 51/32* (2013.01); *H04L 65/403* (2013.01); *H04L 65/601* (2013.01); *H04L 67/10* (2013.01)

(58) Field of Classification Search
  CPC .............. G06F 3/0486; G06F 3/04883; G06F 3/04886; G06F 3/0481; H04N 21/2187; H04N 21/4316; H04N 21/4788; H04N 21/2365; H04N 21/47205; H04N 21/437
  See application file for complete search history.

(56) References Cited

U.S. PATENT DOCUMENTS

| | | | |
|---|---|---|---|
| 2004/0187148 A1* | 9/2004 | Cassella | H04H 20/38 725/35 |
| 2014/0160223 A1* | 6/2014 | Bieselt | H04N 21/23412 348/14.03 |
| 2014/0229866 A1* | 8/2014 | Gottlieb | H04L 12/1822 715/758 |
| 2015/0022625 A1* | 1/2015 | Thapa | H04N 7/15 348/14.08 |
| 2015/0244754 A1* | 8/2015 | Beckham, Jr. | H04L 65/4076 709/219 |
| 2016/0277802 A1* | 9/2016 | Bernstein | H04N 21/4307 |
| 2016/0286244 A1* | 9/2016 | Chang | H04N 21/21805 |
| 2017/0064360 A1* | 3/2017 | Houston | H04N 21/2665 |
| 2017/0064399 A1* | 3/2017 | Jabara | H04N 21/2743 |
| 2017/0336926 A1* | 11/2017 | Chaudhri | G06F 3/04886 |
| 2018/0063556 A1* | 3/2018 | Kalmanson | H04N 21/2187 |
| 2018/0131735 A1* | 5/2018 | McGregor | H04N 21/4627 |
| 2018/0295175 A1* | 10/2018 | Smith | A63F 13/335 |

* cited by examiner

*Primary Examiner* — Cheikh T Ndiaye
(74) *Attorney, Agent, or Firm* — Sheppard Mullin Richter & Hampton LLP

(57) ABSTRACT

Systems, methods, and non-transitory computer-readable media can determine that a broadcaster of a first live content stream has identified at least one user of a social networking system to join as co-broadcaster. A merged live content stream is published through the social networking system, the merged live content stream including the first live content stream of the broadcaster and a second live content stream associated with the at least one identified user. At least one notification is sent to one or more other users of the social networking system. The notification informs the one or more other users about the merged live content stream.

18 Claims, 11 Drawing Sheets

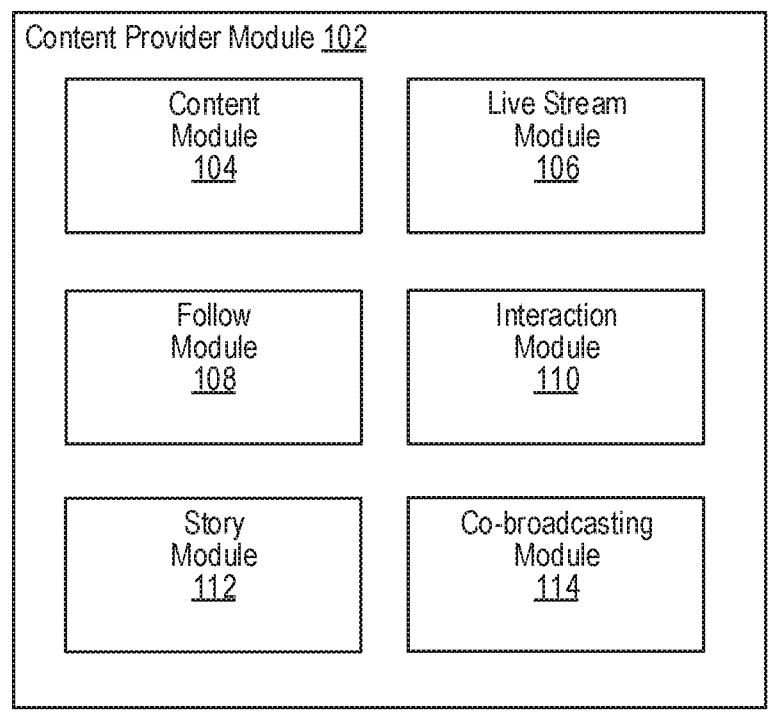
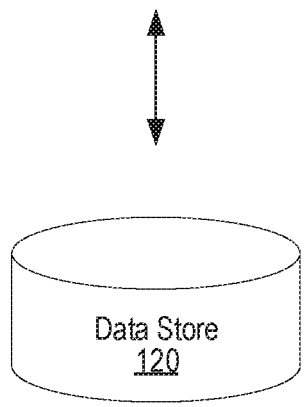
FIGURE 1

500

```
┌─────────────────────────────────────────────────────┐
│ Determine that a broadcaster of a first live content stream has
│ identified at least one user of a social networking system to join as
│ co-broadcaster
│ 502
└─────────────────────────────────────────────────────┘
                            │
                            ▼
┌─────────────────────────────────────────────────────┐
│ Publish a merged live content stream through the social
│ networking system, the merged live content stream including the
│ first live content stream of the broadcaster and a second live
│ content stream associated with the at least one identified user
│ 504
└─────────────────────────────────────────────────────┘
                            │
                            ▼
┌─────────────────────────────────────────────────────┐
│ Send at least one notification to one or more other users of the
│ social networking system, wherein the notification informs the one
│ or more other users about the merged live content stream
│ 506
└─────────────────────────────────────────────────────┘
```

SYSTEMS AND METHODS FOR SHARED BROADCASTING

FIELD OF THE INVENTION

The present technology relates to the field of content broadcasting. More particularly, the present technology relates to techniques for broadcasting live content.

BACKGROUND

Users often utilize computing devices for a wide variety of purposes. Users can use their computing devices to, for example, interact with one another, access media content, share media content, and create media content. In some cases, media content can be provided by members of a social network. The media content can include one or a combination of text, images, videos, and audio. The media content may be published to the social network for consumption by others.

Under conventional approaches, users may post various content items to a social networking system. In general, content items posted by a first user can be included in the respective content feeds of other users of the social networking system, for example, that have "followed" the first user. By following (or subscribing to) the first user, some or all content that is produced, or posted, by the first user may be included in the respective content feeds of the following users. A user following the first user can simply unfollow the first user to prevent new content that is produced by the first user from being included in the following user's content feed.

SUMMARY

Various embodiments of the present disclosure can include systems, methods, and non-transitory computer readable media configured to determine that a broadcaster of a first live content stream has identified at least one user of a social networking system to join as co-broadcaster; publish a merged live content stream through the social networking system, the merged live content stream including the first live content stream of the broadcaster and a second live content stream associated with the at least one identified user; and send at least one notification to one or more other users of the social networking system, wherein the notification informs the one or more other users about the merged live content stream.

In some embodiments, the at least one user is identified from a list of viewers accessing the first live content stream.

In some embodiments, the at least one user is identified in response to the broadcaster selecting a comment posted by the at least one user in response to the first live content stream.

In some embodiments, the at least one user is identified from a list of suggested co-broadcasters.

In some embodiments, the list of suggested co-broadcasters includes viewers of the first live content stream that have at least a threshold number of followers.

In some embodiments, the at least one notification is sent as a message to users of the social networking system that follow the broadcaster or the at least one identified user.

In some embodiments, the at least one notification is provided visually to users of the social networking system that follow the broadcaster or the at least one identified user, the notification being provided as a set of layered avatars that correspond to the broadcaster and the at least one identified user.

In some embodiments, the set of layered avatars include a first avatar corresponding to the broadcaster and a second avatar corresponding to the co-broadcaster, wherein the avatars are layered so that the first avatar partially covers the second avatar.

In some embodiments, the systems, methods, and non-transitory computer readable media are configured to determine that the at least one identified user is no longer a co-broadcaster; identify a set of users that follow the at least one identified user but do not follow the broadcaster; and prevent the set of users from accessing the first live content stream.

In some embodiments, the merged live content stream is accessible by viewers through an interface that includes a first region and a second region, wherein the first live content stream is shown in the first region, and wherein the second live content stream broadcast is shown in the second region.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 1 illustrates an example system including an example content provider module, according to an embodiment of the present disclosure.

FIG. 5 illustrates an example method, according to an embodiment of the present disclosure.

Figure 2:
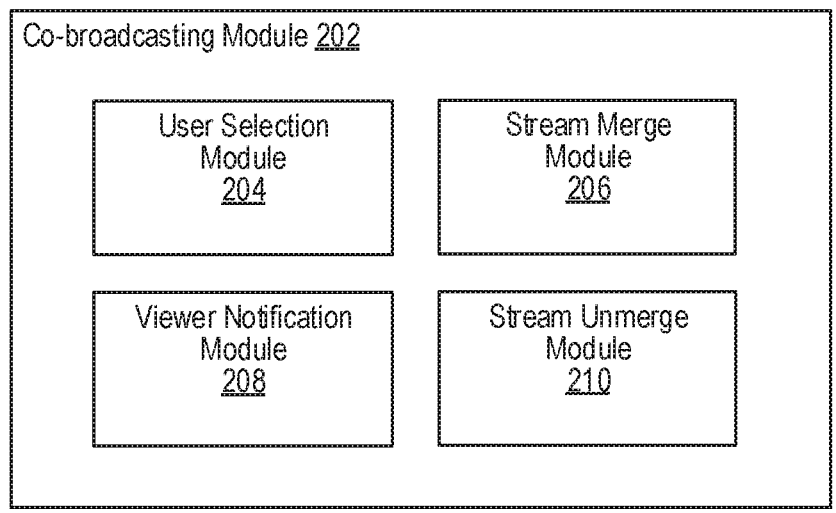
FIG. 2 illustrates an example of a co-broadcasting module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Shared Broadcasting

Under conventional approaches, content may be broadcast through a content provider (e.g., social networking system) using various broadcast mediums (e.g., Internet broadcasting, etc.). In one example, a live content stream can include content that is being captured and streamed live by a user (e.g., a broadcaster). For example, the broadcaster can capture and stream an event (e.g., a live video of the broadcaster, concert, speech, etc.) as part of a live content stream. Such events can be captured using computing devices (e.g., mobile devices with audio and video capture capabilities) and/or standalone devices (e.g., video cameras and microphones). A user (e.g., a viewer) operating a computing device can access the live content stream through the content provider. In response, the content provider encodes and provides data corresponding to the live content stream to the user's computing device over a network (e.g., the Internet) in real-time. The computing device can decode and present the live content stream, for example, through a display screen of the computing device. In general, the live content stream continues to be provided to the user's computing device until the broadcaster discontinues broadcasting the live content stream or the user instructs the computing device to stop accessing the live content stream, for example. In some instances, the broadcaster may want to add one or more co-broadcasters to the live content stream. Under conventional approaches, the co-broadcasters would need to be in the same geographic location as the broadcaster so that all participants can be included in a camera view of a single computing device. Such restrictions, therefore, do not contemplate a live content stream having co-broadcasters that are in different geographic locations and/or broadcasting from different computing devices. Moreover, conventional approaches may be limited with respect to distribution of the live content stream. For example, conventional approaches are typically not equipped to identify a target user audience for a given live content stream or to encourage users in that target audience to view the live content stream. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, a content provider (e.g., social networking system) is configured to allow co-broadcasters to participate in the same live content stream while broadcasting from separate geographic locations and/or computing devices. For example, in some embodiments, a first user may broadcast a live content stream using a computing device. In this example, the first user can invite a second user to join the live content stream as a co-broadcaster. The second user can capture and provide a separate live content stream from the second user's computing device. The second user may or may not be located at the first user's geographic location. The second user's live content stream can then be merged with the first user's live content stream so that both the first user and the second user appear together in a merged live content stream. In some embodiments, the merged live content stream can be divided into a first region in which the first user's live content stream is presented and a second region in which the second user's live content stream is presented. In various embodiments, the merged live content stream is published and made available through a social networking system. In some embodiments, notifications concerning the merged live content stream are sent to users of the social networking system that follow the first user. In some embodiments, notifications concerning the merged live content stream are also sent to users of the social networking system that follow the second user. In some embodiments, followers of a particular co-broadcaster are only able to access a live content stream while the particular co-broadcaster is presenting. In such embodiments, followers that do not follow any other co-broadcasters of the live content stream are denied access to the live content stream once the particular co-broadcaster leaves the live broadcast. More details relating to the disclosed technology are provided below.

FIG. 1 illustrates an example system 100 including an example content provider module 102, according to an embodiment of the present disclosure. As shown in the example of FIG. 1, the content provider module 102 can include a content module 104, a live stream module 106, a follow module 108, an interaction module 110, a story module 112, and a co-broadcasting module 114. In some instances, the example system 100 can include at least one data store 120. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user or client computing device. In one example, the content provider module 102 or at least a portion thereof can be implemented as or within an application (e.g., app), a program, or an applet, etc., running on a user computing device or a client computing system, such as the user device 610 of FIG. 6. In another example, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6. The content provider module 102 can be implemented as or within a dedicated application (e.g., app), a program, or an applet running on a user computing device or client computing system. The application incorporating or implementing instructions for performing some, or all, functionality of the content provider module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The content provider module 102 can be configured to communicate and/or operate with the at least one data store 120, as shown in the example system 100. The at least one data store 120 can be configured to store and maintain various types of data. For example, the data store 120 can store information describing various content that is being broadcasted live or has been posted by users of a social networking system. In some implementations, the at least one data store 120 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 120 can store information associated with users, such as user identifiers, user information, profile information, user specified settings, content produced or posted by users, and various other types of user data.

The content module 104 can be configured to provide users with access to content (e.g., media content items) that is available through a social networking system. In some instances, this content can include media content items that are posted in content feeds accessible through the social networking system. For example, the content module 104 can provide a first user with access to media content items through an interface that is provided by a software application (e.g., a social networking application) running on a computing device of the first user. Such media content items may include previously posted media content items as well as content that is being streamed live (e.g., live content streams). The first user can also interact with the interface to post media content items to the social networking system. Such media content items may include text, images, audio, and videos, for example. For example, the first user can submit a post to be published through the social networking system. In some embodiments, the post can include, or reference, one or more media content items. The social networking system can then provide the media content items through the social networking system including, for example, in one or more content feeds. In some embodiments, the interface can also include an option for live streaming content through the social networking system. When initiating a live content stream, the live stream module 106 can be utilized to communicate data (e.g., audio data, video data, etc.) corresponding to the content to be streamed live from the computing device and through the social networking system. The live stream module 106 can utilize any generally known techniques that allow for live streaming of content including, for example, the Real Time Messaging Protocol (RTMP). In various embodiments, the computing device from which the live content stream is being provided can be equipped to capture data (e.g., video data, audio data, etc.) corresponding to the live content stream. Another user operating a computing device can access the live content stream through the social networking system. For example, the user may select an option to view the live content stream and, in response, the social networking system can send data corresponding to the live content stream to the computing device of the user. In this example, the social networking system can continue sending data corresponding to the live content stream until, for example, the broadcaster of the live content stream discontinues streaming or if the user selects an option to discontinue playback of the live content stream.

In various embodiments, other users of the social networking system can access media content items posted by the first user. In one example, the other users can access the media content items by searching for the first user by user name or for relevant search terms through an interface provided by a software application (e.g., a social networking application, browser, etc.) running on their respective computing devices. In some instances, some users may want to see media content items posted by the first user in their respective content feed. To cause media content items posted by the first user to be included in their respective content feed, a user can select an option through the interface to subscribe to, or "follow", the first user. The follow module 108 can process the user's request by identifying the user as a follower of (or "friend" of) the first user in the social networking system. As a result, some or all media content items that are posted (or being streamed live) by the first user can automatically be included in the respective content feed of the user. If the user decides that they no longer want to see content from the first user in their respective content feed, the user can select an option through the interface to unsubscribe from, or "unfollow", the first user. As a result, the follow module 108 can remove the association between the user and the first user so that media content items posted by the first user are no longer included in the content feed of the user.

In some instances, users may want to interact with posted media content items. For example, a user may want to endorse, or "like", a media content item. In this example, the user can select an option provided in the interface to like the desired media content item. The interaction module 110 can determine when a user likes a given media content item and can store information describing this relationship. The interaction module 110 can also determine when other forms of user interaction are performed and can store information describing the interaction (e.g., information describing the type of interaction, the identity of the user, the identity of the user that posted the media content item, and the media content item, to name some examples). For example, the user may want to post a comment in response to a media content item. In this example, the user can select an option provided in the interface to enter and post the comment for the desired media content item. The interaction module 110 can determine when a user posts a comment in response to a given media content item and can store information describing this relationship. Other forms of user interaction can include emoji-based reactions to a media content item (e.g., selecting an option that corresponds to a particular reaction emoji, e.g., happy, sad, angry, etc.), for example.

In some embodiments, the story module 112 can provide an option that allows users to post their content as stories. In such embodiments, each user has a corresponding story (or story feed) in which the user can post content. When a user's story is accessed by another user, the story module 112 can provide content posted in the story to the other user for viewing. In general, content posted in a user's story may be accessible by any user of the social networking system. In some embodiments, content posted in a user's story may only be accessible to followers of the user. In some embodiments, user stories expire after a pre-defined time interval (e.g., every 24 hours). In such embodiments, content posted in stories is treated as ephemeral content that is made inaccessible once the pre-defined time interval has elapsed. In contrast, content posted in a user (or follower) content feed can be treated as non-ephemeral content that remains accessible for an indefinite period of time.

In various embodiments, the co-broadcasting module 114 can be configured to provide various options for adding co-broadcasters to live content streams and/or removing co-broadcasters that were added to live content streams. More details regarding the co-broadcasting module 114 will be provided below with reference to FIG. 2.

FIG. 2 illustrates an example of a co-broadcasting module 202, according to an embodiment of the present disclosure. In some embodiments, the co-broadcasting module 114 of FIG. 1 can be implemented as the co-broadcasting module 202. As shown in FIG. 2, the co-broadcasting module 202 can include a user selection module 204, a stream merge module 206, a viewer notification module 208, and a stream unmerge module 210.

A user operating a computing device can access (e.g., view) a live content stream through a content provider. In one example, the live content stream may be accessed as a media content item included in a content feed corresponding to the user. In another example, the user may have searched for the live content stream through the content provider by, for example, submitting queries through a search engine or navigating through various media content presented through an interface. When accessed, the content provider can encode and send data corresponding to the live content stream to the computing device of the user. The computing device can decode and present video data corresponding to the live content stream, for example, in an interface being provided through a display screen of the computing device. Any audio data corresponding to the live content stream can be played or reproduced, for example, through an audio output source (e.g., speaker(s)) associated with the computing device. In some embodiments, while the live content stream is being accessed, the interface can provide the user with one or more options for interacting with the live content stream. For example, the interface can include an option for "liking" the live content stream, one or more options for reacting to the live content stream, or an option for posting comments in response to the live content stream, to name some examples.

In various embodiments, the co-broadcasting module 202 can be utilized to add co-broadcasters to live content streams and/or to remove co-broadcasters from live content streams. For example, a broadcaster of the live content stream can invite one or more users to join the live content stream as co-broadcasters. In some embodiments, the user selection module 204 provides options for inviting users to join the live content stream as co-broadcasters. For example, in some embodiments, the broadcaster is able to select an option to search for users to be invited to join the live content stream as co-broadcasters. In some embodiments, the broadcaster is able to invite users that are currently viewing the live content stream. For example, in some embodiments, when broadcasting the live content stream, the broadcaster can access an interface through a display screen of the broadcaster's computing device. The interface can include a first region in which the live content stream being broadcasted is presented, for example, to allow the broadcaster to monitor the live content stream. The interface can also include a second region through which the broadcaster can access various information relating to the broadcast. In some embodiments, the broadcaster can select an option through the interface to access a list of users that are viewing the live content stream, as illustrated in the example of FIG. 3B. The user selection module 204 can determine which users are viewing the live content stream. The user selection module 204 can then provide the list of users for display, for example, in the second region of the interface. The broadcaster can review the list of users to identify one or more users to invite to join the broadcast. In some embodiments, the broadcaster can invite a user to join as co-broadcaster by selecting a comment posted by the user. For example, a user viewing a live content stream may post a comment through the social networking system in response to the live content stream. The comment can be posted in a comment feed associated with the live content stream. In some embodiments, the comment feed can be visible only to the broadcaster of the live content stream. In some embodiments, the comment feed can be visible to the broadcaster and also viewers of the live content stream. In this example, the broadcaster may select a comment posted by some user (e.g., "would love to join as co-broadcaster!"). In response, the user selection module 204 can send one or more invitations to the user that posted the selected comment asking the user to join as co-broadcaster. In some embodiments, the user selection module 204 can suggest users to be added as co-broadcasters. For example, in some embodiments, users (or viewers) having at least a threshold number of followers on the social networking system can be provided as suggestions to the broadcaster. Many variations are possible.

Once a user is selected to join as co-broadcaster, the user selection module 204 is configured to send one or more invitations to the user. In some embodiments, such invitations are provided to the user as messages sent to the user through the social networking system. A user can choose to accept or decline the invitation to join the broadcast. In some embodiments, when the user declines the invitation, a notification is provided to the broadcaster indicating that the invitation was declined. In some embodiments, when the user accepts the invitation, the user's computing device is instructed to capture and provide a separate live content stream to the content provider, as described above. Once the user's separate live content stream is active, the stream merge module 206 merges the broadcaster's live content stream and the user's live content stream so that both the broadcaster (i.e., primary broadcaster) and the user (i.e., co-broadcaster) appear in a merged live content stream, as illustrated in the example of FIG. 3C. In some embodiments, the merged live content stream is presented to users as a split screen that is divided into a first region and a second region. In such embodiments, the broadcaster's live content stream is presented in the first region while the co-broadcaster's live content stream is presented in the second region. In one example, the split screen may be divided horizontally so that the first region is positioned above the second region. In another example, the split screen may be divided vertically so that the first region and the second region are positioned side-by-side. In some embodiments, the regions may be sized differently for broadcasters and co-broadcasters. For example, the first region in which the broadcaster's live content stream is presented may be larger than the second region in which the co-broadcaster's live content stream is presented. In some embodiments, additional co-broadcasters can be added to the merged live content stream, as described above. In such embodiments, the screen may be divided accordingly to accommodate the additional co-broadcasters.

Figure 4A:
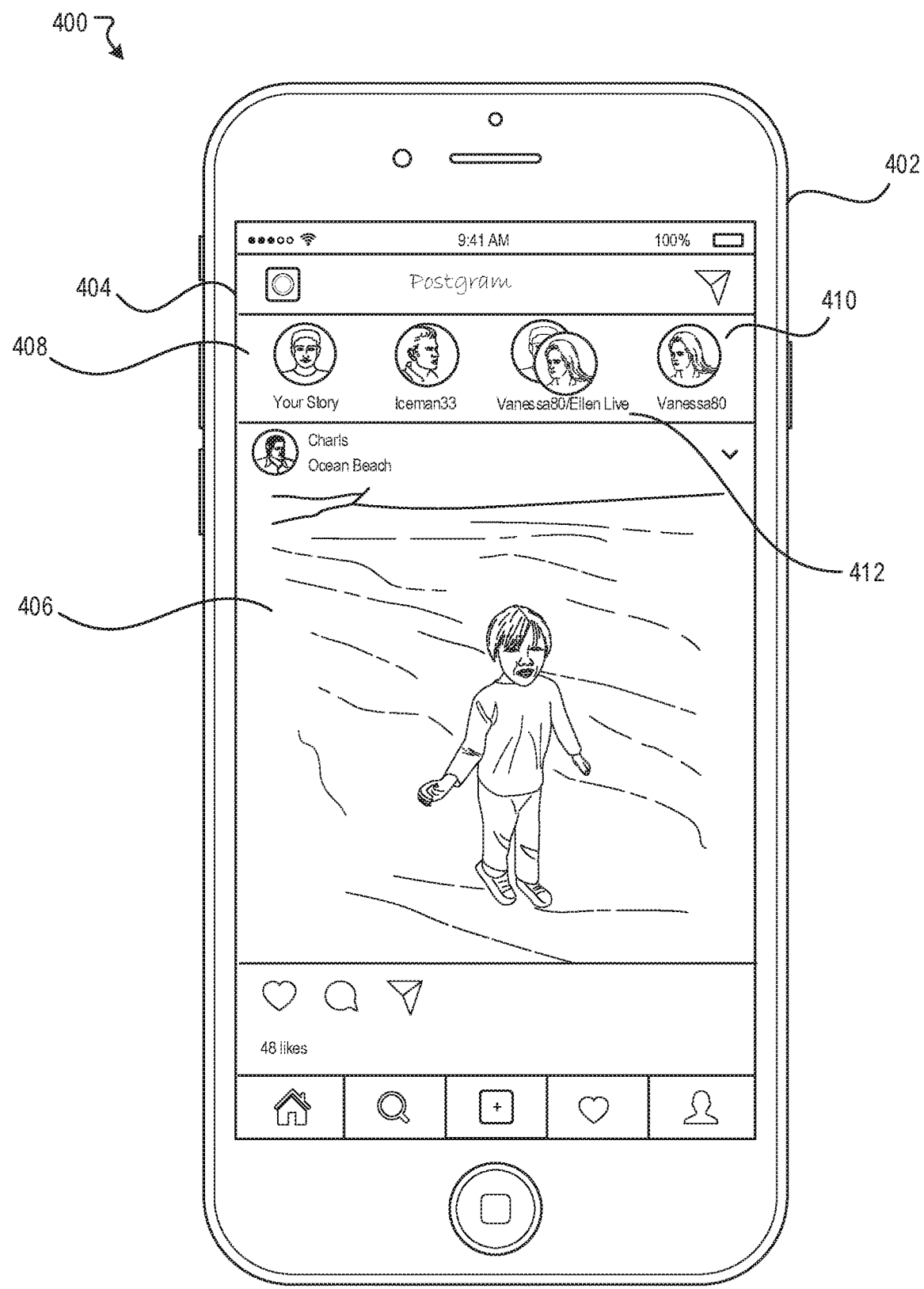
FIGS. 4A-B illustrate example interfaces, according to an embodiment of the present disclosure.

In various embodiments, the viewer notification module 208 sends one or more notifications to inform users of the social networking system about the live content stream. For example, in some embodiments, the viewer notification module 208 sends one or more messages about the live content stream to users following the broadcaster (i.e., followers of the broadcaster) through the social networking system. In some embodiments, after a user is added to the live content stream as co-broadcaster, the viewer notification module 208 sends one or more messages about the live content stream to users following the co-broadcaster (i.e., followers of the co-broadcaster) through the social networking system. In some embodiments, the live content stream remains accessible to followers of the co-broadcaster as long as the co-broadcaster is actively broadcasting. In some embodiments, the viewer notification module 208 informs users of the social networking system about the live content stream using visual cues. For example, in some embodiments, when a broadcaster starts a live content stream, an avatar corresponding to the broadcaster can be surfaced in a stories media tray, as illustrated in the example of FIG. 4A. In some embodiments, when co-broadcasters are added to the live content stream, avatars corresponding to the broadcaster and added co-broadcaster(s) can be surfaced in the stories media tray. In some embodiments, these avatars can be layered as overlays with each subsequent avatar being partially covered by a preceding avatar, as illustrated in the example of FIG. 4A.

There may be instances in which a co-broadcaster needs to be removed from the merged live content stream. In some embodiments, the co-broadcaster can select an option to end their broadcast. In such embodiments, the stream unmerge module 210 unmerges the merged live content stream to disconnect the live content stream corresponding to the co-broadcaster. In some embodiments, the primary broadcaster and/or authorized users (e.g., moderators, etc.) are permitted to remove, or disconnect, any co-broadcasters from the merged live content stream. Once disconnected, the live content stream continues broadcasting without the co-broadcaster. In some embodiments, a live content stream ceases to be accessible to users that follow a co-broadcaster once the co-broadcaster stops broadcasting unless those users also follow the broadcaster (or at least one other co-broadcaster) of the live content stream. For example, in some embodiments, the live content stream is no longer accessible to users that follow the co-broadcaster once the co-broadcaster exits (or ends) the co-broadcast. However, in such embodiments, if those users also follow another co-broadcaster (e.g., the primary broadcaster), then the users are still permitted to access the live content stream. In some embodiments, a live content stream is no longer accessible to users that follow a co-broadcaster after the co-broadcaster is removed from the live content stream unless those users also follow another co-broadcaster (e.g., the primary broadcaster) of the live content stream.

Figure 3A:
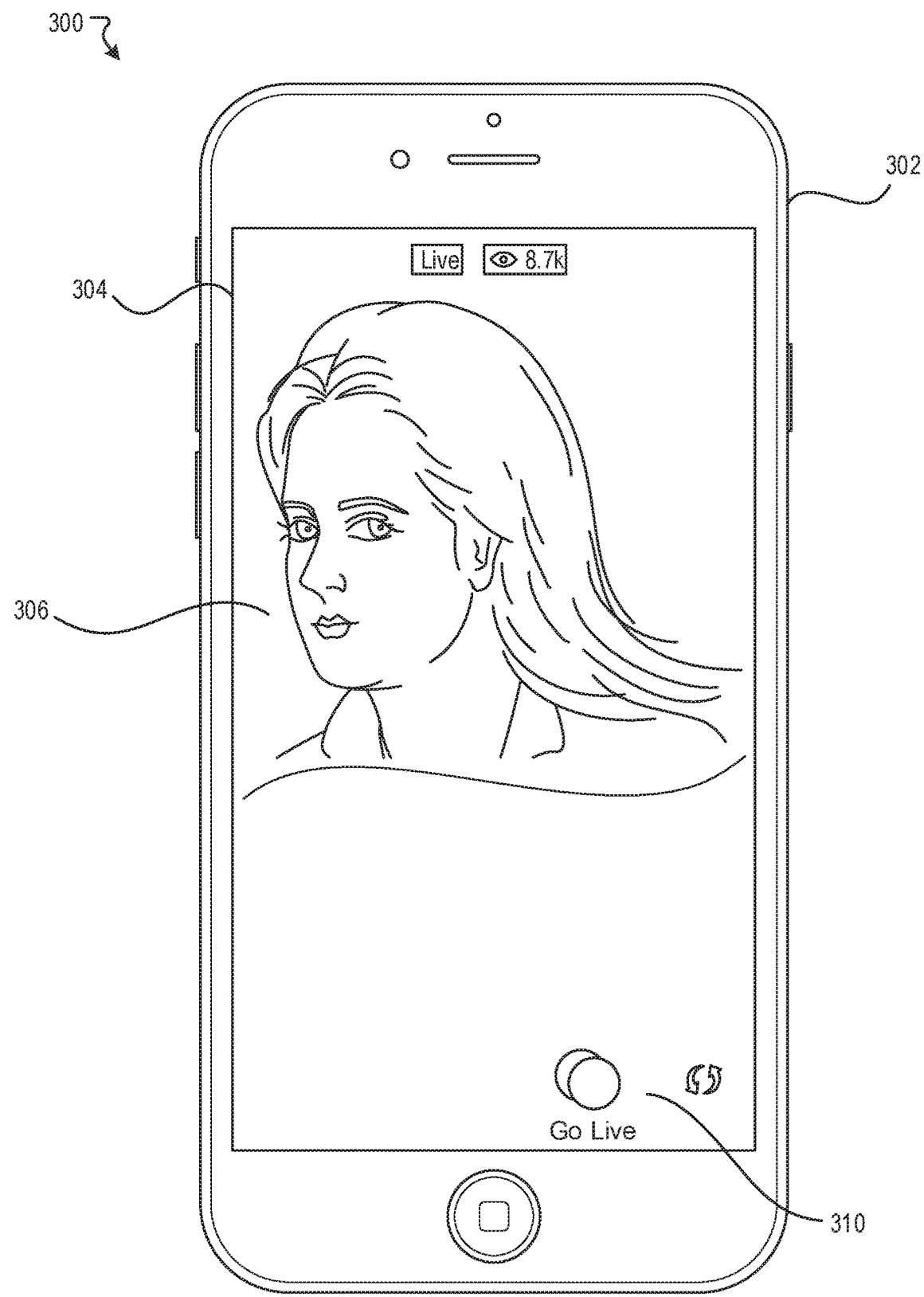
FIGS. 3A-3D illustrate example interfaces, according to an embodiment of the present disclosure.
Figure 3B:
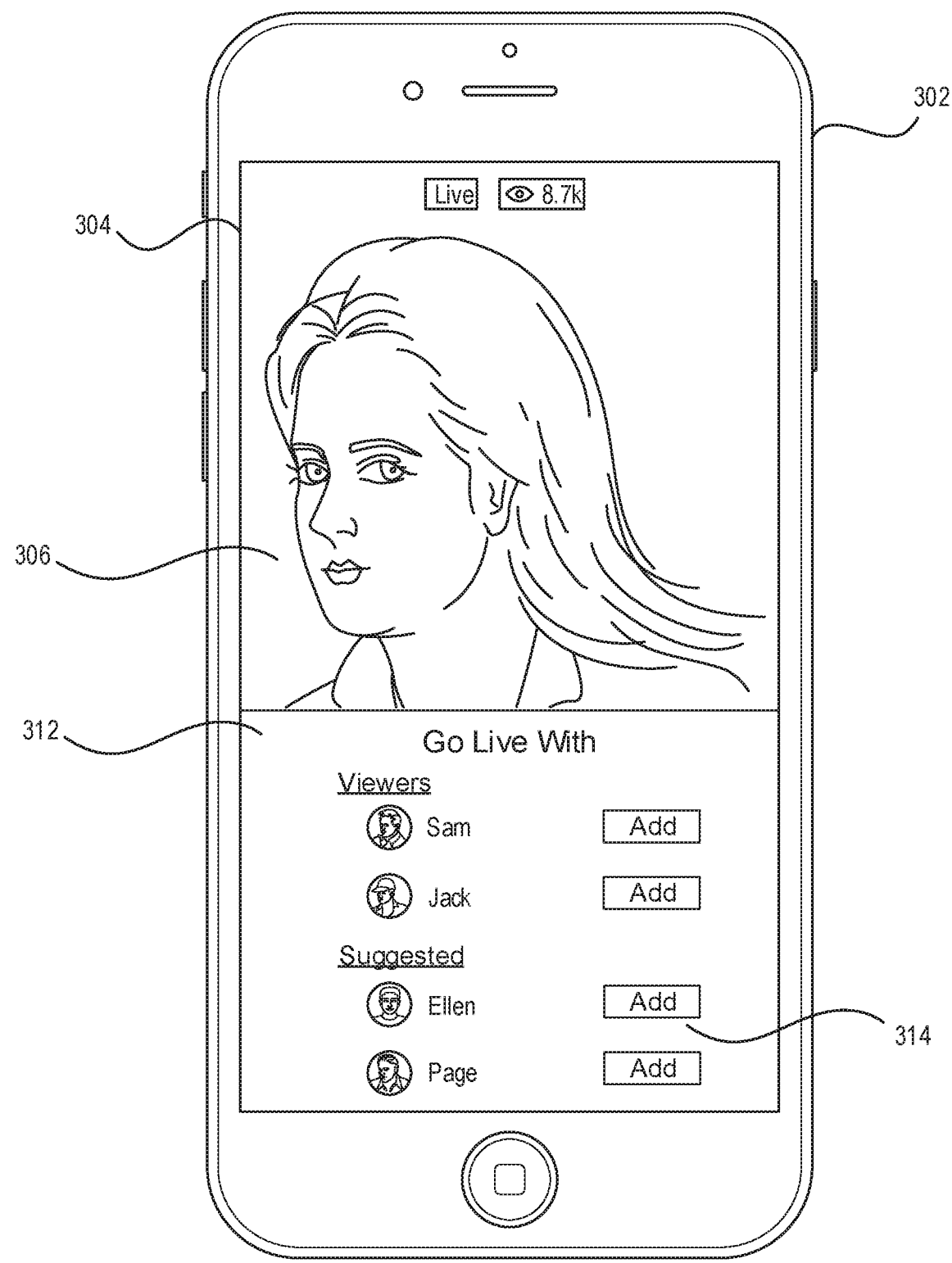
Figure 3C:
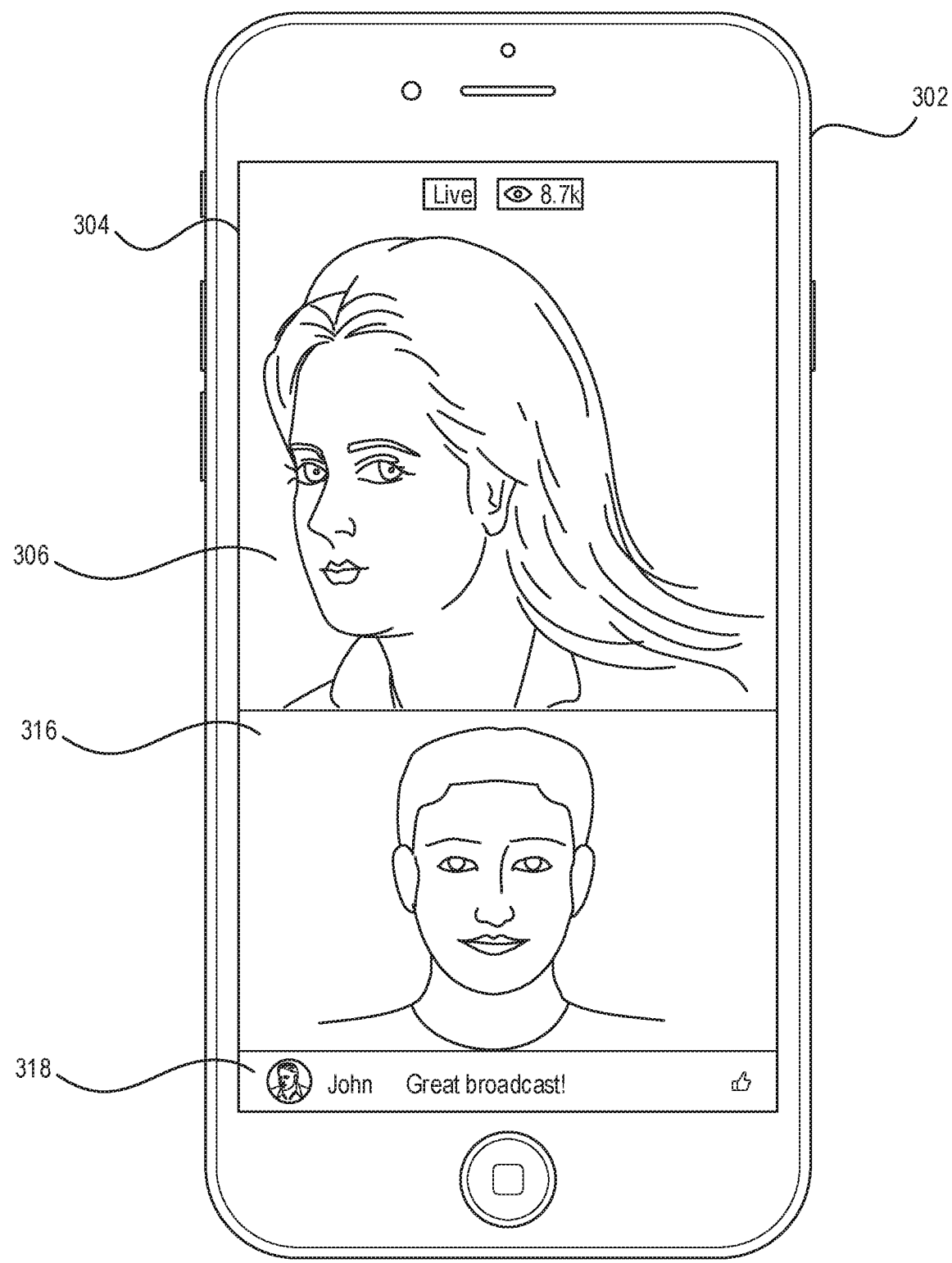
Figure 3D:
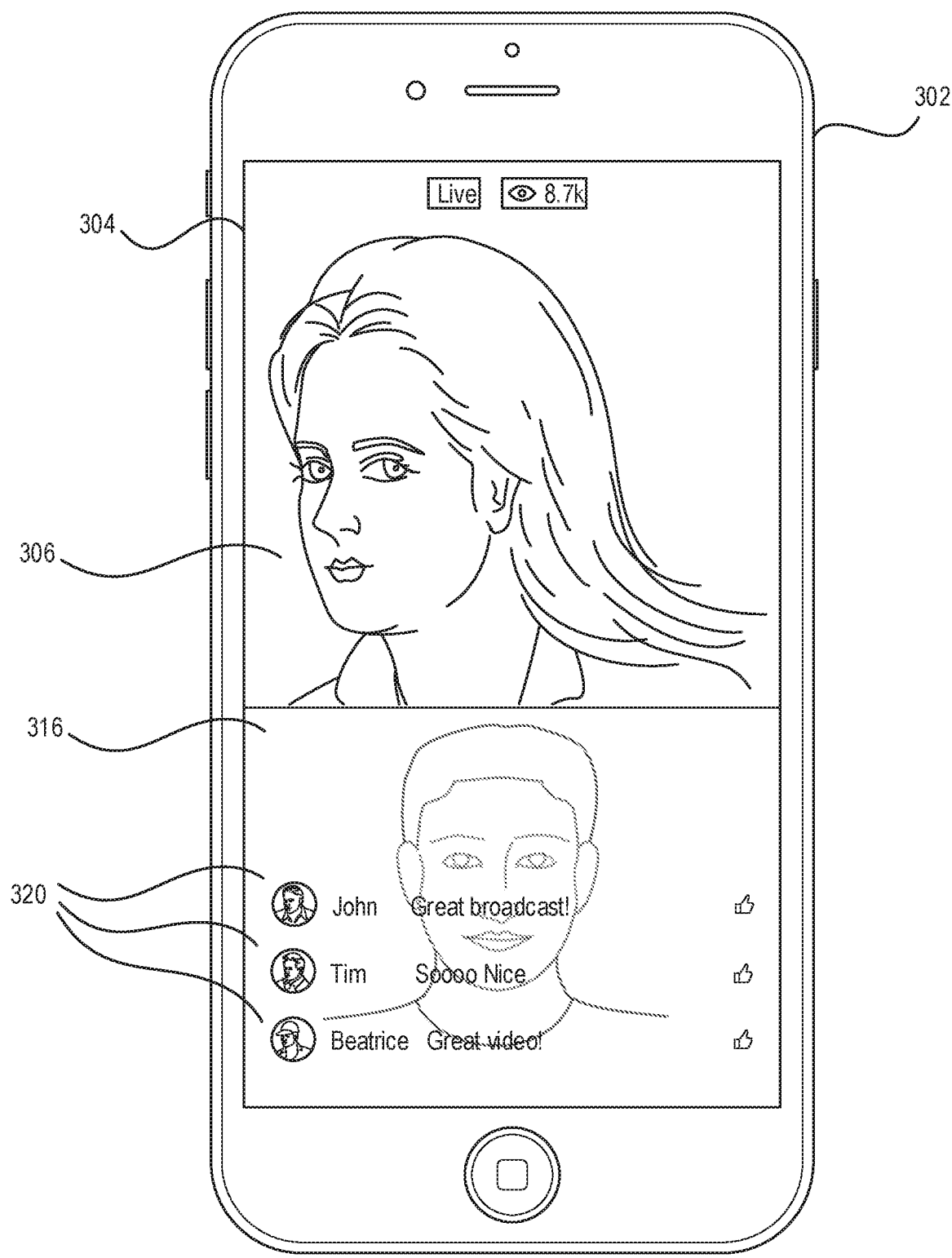

FIG. 3A illustrates an example 300 of an interface 304 for streaming live content, according to an embodiment of the present disclosure. The interface 304 is presented on a display screen of the computing device 302. The interface 304 may be provided through an application (e.g., a web browser, a social networking application, etc.) running on the computing device 302. In this example, the user (e.g., broadcaster) operating the computing device 302 is broadcasting a live content stream that is being recorded using the computing device 302. As a result, the interface 304 includes a region 306 in which the live content stream being broadcasted is displayed. In some embodiments, the interface 304 can also include a region in which comments posted by viewers in response to the live content stream are displayed. In some embodiments, the broadcaster can invite a user to join the broadcast as co-broadcaster by selecting a comment posted by the user in this region. In some embodiments, the broadcaster can select an option 310 to invite other users to join the broadcast as co-broadcasters. After selecting the option 310, the user can be provided a list of users 312 that can be invited to join the broadcast, as illustrated in the example of FIG. 3B. The list of users 312 can include current viewers of the live content stream, viewers of the live content stream that have posted one or more comments in response to the live content stream, and/or suggested users. The broadcaster can select a corresponding add option 314 to invite a particular user (e.g., Ellen) to join the live content stream as co-broadcaster. Once the invited user joins, the interface 304 can be updated to present a merged live content stream that includes a live feed corresponding to the broadcaster in region 306 and a live feed corresponding to the co-broadcaster in region 316, as illustrated in the example of FIG. 3C. In some embodiments, comments posted by viewers can be shown in a condensed comment section 318. In some embodiments, the comment section 318 has a fixed size (e.g., 1.5 lines of text) so that no more than a pre-defined number of comments are shown at any given time during the broadcast. In some embodiments, a user can select (e.g., tap) the comment section 318 to reveal additional comments in a comments overlay 320, as illustrated in the example of FIG. 3D. As mentioned, in some embodiments, the broadcaster can invite a user to join the broadcast as co-broadcaster by selecting a comment posted by the user in the comment section 318. Many variations are possible.

Figure 4B:
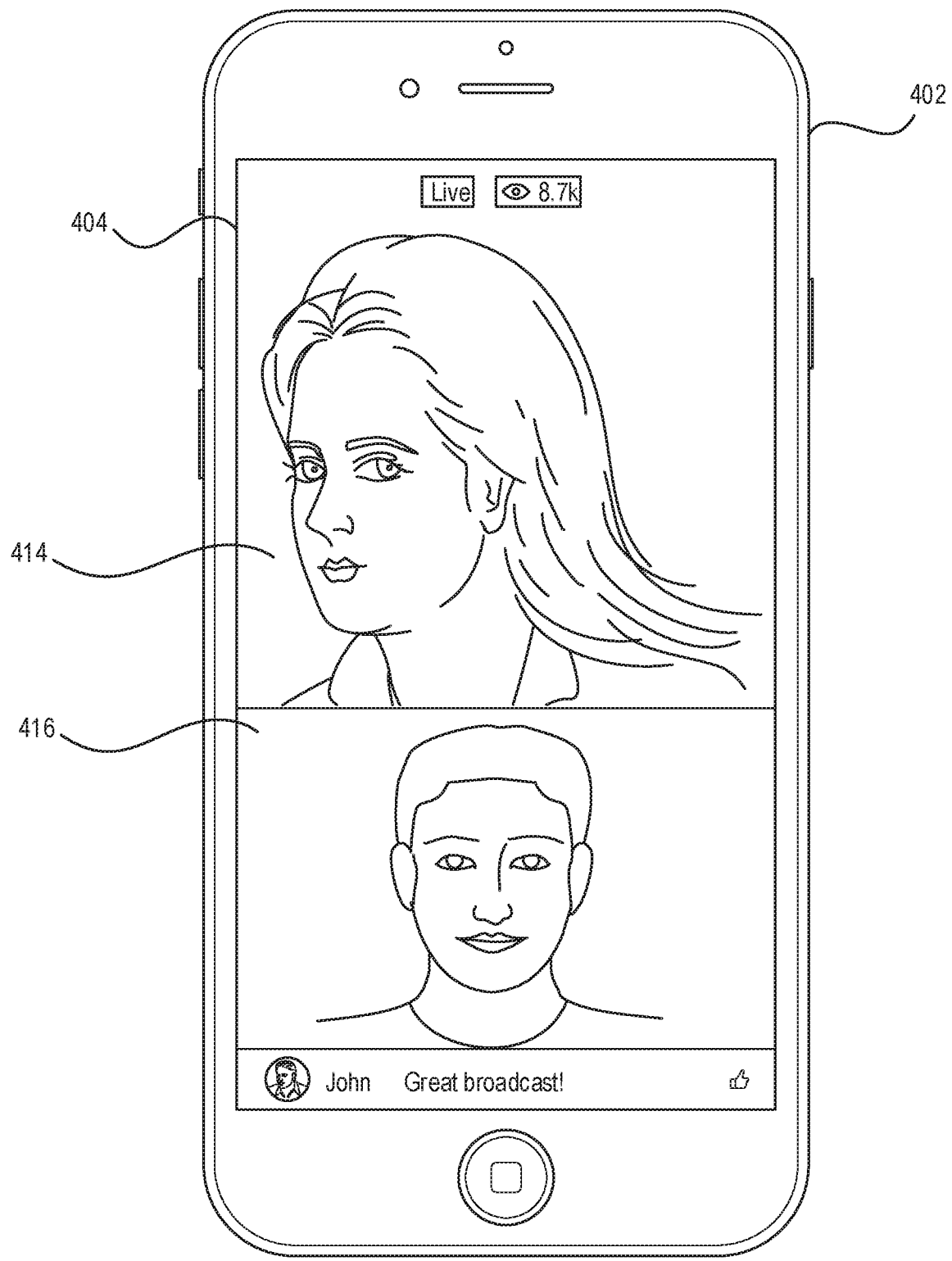

FIG. 4A illustrates an example 400 of an interface 404 for streaming live content, according to an embodiment of the present disclosure. The interface 404 is presented on a display screen of the computing device 402. The interface 404 may be provided through an application (e.g., a web browser, a social networking application, etc.) running on the computing device 402. In this example, the interface 404 includes a region 406 for accessing content (e.g., content in a content feed). The interface 404 also includes a media tray region 408 from which user stories can be accessed. In this example, the media tray region 408 displays avatars corresponding to users that have posted stories. For example, the media tray region 408 includes an avatar 410 that can be selected to access one or more ephemeral stories posted by the user Vanessa80. In some embodiments, avatars corresponding to users that are live broadcasting can also be shown in the media tray region 408. For example, the media tray region 408 includes a set of layered avatars 412 corresponding to users Vanessa80 and Ellen who are co-broadcasting. In some embodiments, the avatar corresponding to the primary broadcaster (e.g., Vanessa80) is shown on top. In some embodiments, subsequent avatars included in the set of layered avatars 412 can be covered partially by a preceding avatar. Many variations are possible. In some embodiments, the layered avatars 412 corresponding to the live broadcast are only shown to users of the social networking system that follow at least one of the co-broadcasters (i.e., Vanessa80 and/or Ellen). In some embodiments, the layered avatars 412 are no longer accessible by followers of a particular co-broadcaster after that co-broadcaster exits the broadcast unless those followers also follow at least one other co-broadcaster of the broadcast. Many variations are possible. The user operating the computing device 402 can select the layered avatars 412 to access the co-broadcast, as illustrated in the example of FIG. 4B. In FIG. 4B, the interface 404 has been updated to present the co-broadcast. In this example, a live content stream being captured and streamed from a computing device being operated by the broadcaster is shown in a region 414 while a live content stream being captured and streamed from a computing device being operated by the co-broadcaster is shown in a region 416. Many variations are possible.

FIG. 5 illustrates an example method 500, according to an embodiment of the present disclosure. It should be appreciated that there can be additional, fewer, or alternative steps performed in similar or alternative orders, or in parallel, within the scope of the various embodiments discussed herein unless otherwise stated.

At block 502, a determination is made that a broadcaster of a first live content stream has identified at least one user of a social networking system to join as co-broadcaster. At block 504, a merged live content stream is published through the social networking system. The merged live content stream includes the first live content stream of the broadcaster and a second live content stream associated with the at least one identified user. The second live content stream can be captured and provided by a computing device being operated by the at least one identified user. At block 506, at least one notification is sent to one or more other users of the social networking system. The notification can inform the one or more other users about the merged live content stream.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
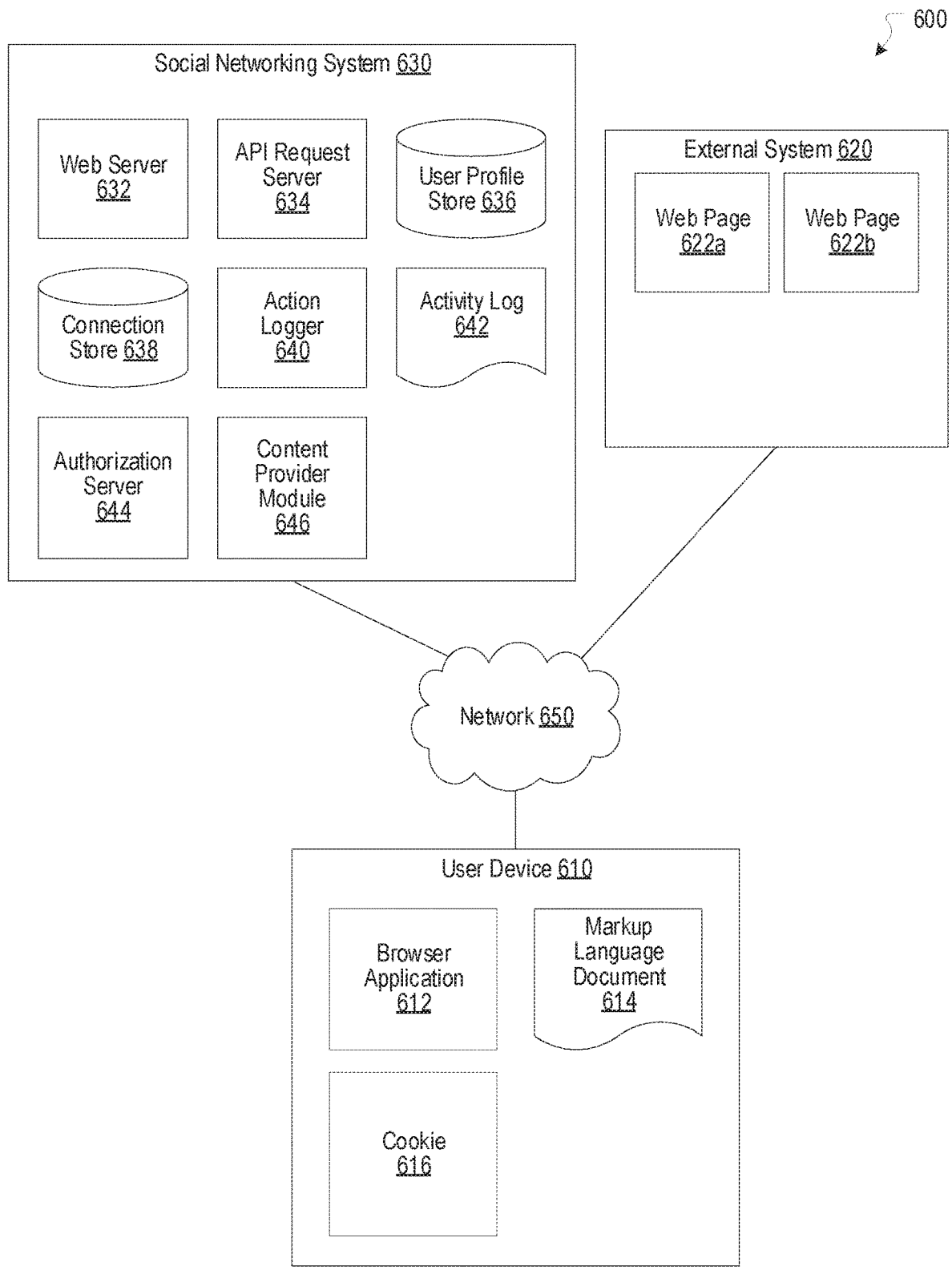
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630.

In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. In some embodiments, one or more functionalities of the content provider module 646 can be implemented in the user device 610. As discussed previously, it should be appreciated that there can be many variations or other possibilities.

Hardware Implementation

Figure 7:
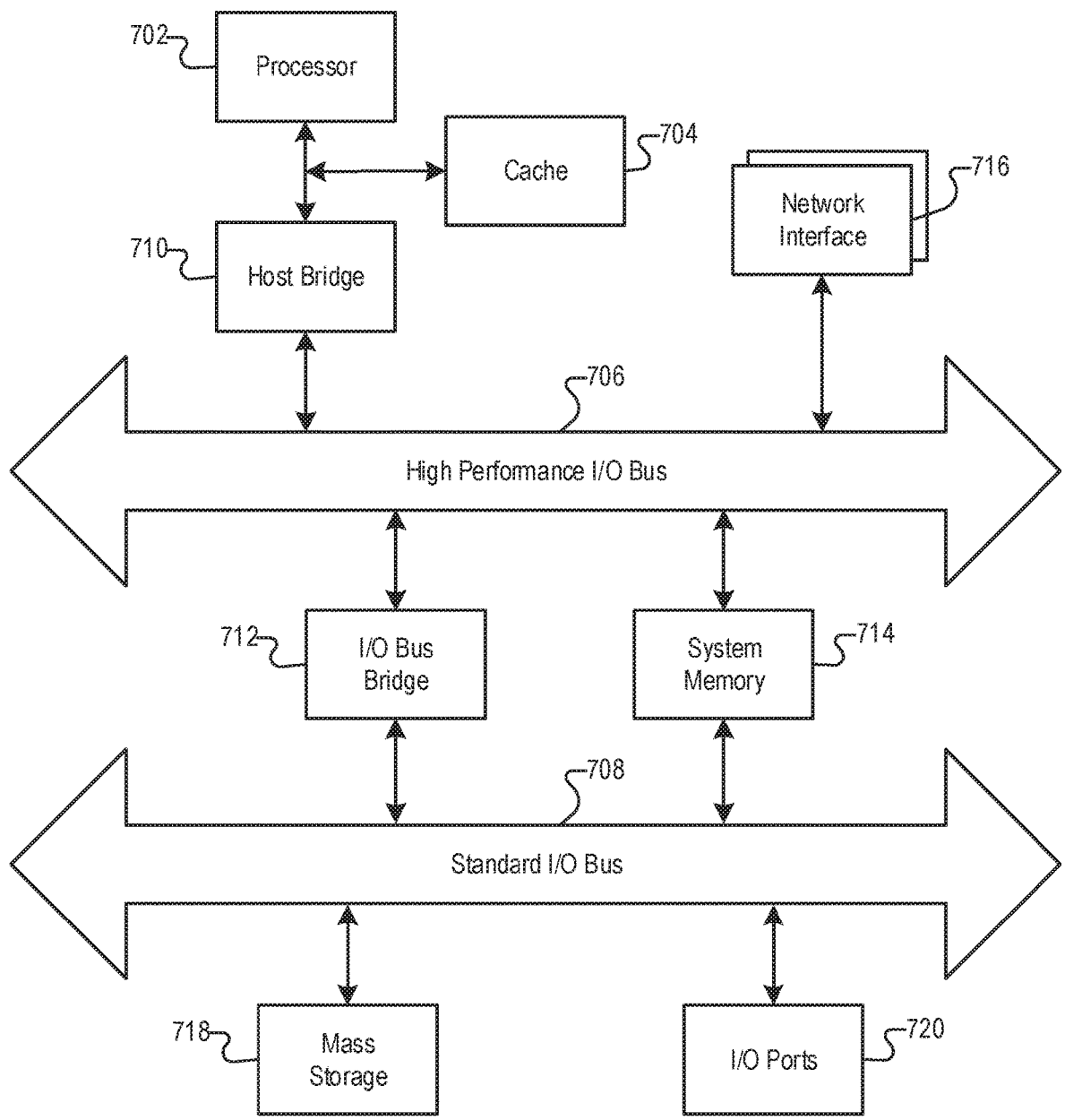
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    determining, by a computing system, that a broadcaster of a first live content stream has identified at least one user of a system to join as co-broadcaster, wherein the at least one user is identified from a list of suggested co-broadcasters, wherein the list includes viewers of the first live content stream with at least a threshold number of followers in the system;
    providing, by the computing system, a merged live content stream for access through the system, wherein the merged live content stream includes the first live content stream of the broadcaster and a second live content stream associated with the at least one identified user, and wherein the merged live content stream is accessible to followers of the at least one identified user as long as the at least one identified user is co-broadcaster; and
    sending, by the computing system, at least one notification to one or more other users of the system, wherein the notification informs the one or more other users about the merged live content stream.

2. The computer-implemented method of claim 1, wherein the at least one user is identified in response to the broadcaster selecting a comment posted by the at least one user.

3. The computer-implemented method of claim 2, wherein the comment was posted to a comment feed visible to the broadcaster and the viewers of the first live content stream.

4. The computer-implemented method of claim 2, wherein the comment was posted to a comment feed visible only to the broadcaster.

5. The computer-implemented method of claim 1, wherein the at least one notification is sent as a message to the one or more other users of the system that follow the broadcaster or the at least one identified user.

6. The computer-implemented method of claim 1, further comprising:
    providing, by the computing system, a set of layered avatars representing the merged live content stream, the set of layered avatars including at least a first avatar that corresponds to the broadcaster and a second avatar that corresponds to the at least one user identified by the broadcaster to join the merged live content stream as co-broadcaster, wherein the set of layered avatars are layered so that the first avatar partially covers the second avatar.

7. The computer-implemented method of claim 1, the method further comprising:
    determining, by the computing system, that the at least one identified user is no longer a co-broadcaster;
    identifying, by the computing system, a set of users that follow the at least one identified user but do not follow the broadcaster; and
    preventing, by the computing system, the set of users from accessing the first live content stream.

8. The computer-implemented method of claim 1, wherein the merged live content stream is accessible by viewers through an interface that includes a first region and a second region, wherein the first live content stream is shown in the first region, and wherein the second live content stream broadcast is shown in the second region.

9. A system comprising:
    at least one processor; and
    a memory storing instructions that, when executed by the at least one processor, cause the system to perform:
        determining that a broadcaster of a first live content stream has identified at least one user of a system to join as co-broadcaster, wherein the at least one user is identified from a list of suggested co-broadcasters, wherein the list includes viewers of the first live content stream with at least a threshold number of followers in the system;
        providing a merged live content stream for access through the system, wherein the merged live content stream includes the first live content stream of the broadcaster and a second live content stream associated with the at least one identified user, and wherein the merged live content stream is accessible to followers of the at least one identified user as long as the at least one identified user is co-broadcaster; and
        sending at least one notification to one or more other users of the system, wherein the notification informs the one or more other users about the merged live content stream.

10. The system of claim 9, wherein the at least one user is identified in response to the broadcaster selecting a comment posted by the at least one user in response to the first live content stream.

11. The system of claim 10, wherein the comment was posted to a comment feed visible to the broadcaster and the viewers of the first live content stream.

12. The system of claim 10, wherein the comment was posted to a comment feed visible only to the broadcaster.

13. The system of claim 9, wherein the instructions further cause the system to perform:
    providing a set of layered avatars representing the merged live content stream, the set of layered avatars including at least a first avatar that corresponds to the broadcaster and a second avatar that corresponds to the at least one user identified by the broadcaster to join the merged live content stream as co-broadcaster, wherein the set of layered avatars are layered so that the first avatar partially covers the second avatar.

14. A non-transitory computer-readable storage medium including instructions that, when executed by at least one processor of a computing system, cause the computing system to perform a method comprising:
   determining that a broadcaster of a first live content stream has identified at least one user of a system to join as co-broadcaster, wherein the at least one user is identified from a list of suggested co-broadcasters, wherein the list includes viewers of the first live content stream with at least a threshold number of followers in the system;
   providing a merged live content stream for access through the system, wherein the merged live content stream includes the first live content stream of the broadcaster and a second live content stream associated with the at least one identified user, and wherein the merged live content stream is accessible to followers of the at least one identified user as long as the at least one identified user is co-broadcaster; and
   sending at least one notification to one or more other users of the system, wherein the notification informs the one or more other users about the merged live content stream.

15. The non-transitory computer-readable storage medium of claim 14, wherein the at least one user is identified in response to the broadcaster selecting a comment posted by the at least one user in response to the first live content stream.

16. The non-transitory computer-readable storage medium of claim 15, wherein the comment was posted to a comment feed visible to the broadcaster and the viewers of the first live content stream.

17. The non-transitory computer-readable storage medium of claim 15, wherein the comment was posted to a comment feed visible only to the broadcaster.

18. The non-transitory computer-readable storage medium of claim 14, wherein the instructions further cause the computing system to perform:
   providing a set of layered avatars representing the merged live content stream, the set of layered avatars including at least a first avatar that corresponds to the broadcaster and a second avatar that corresponds to the at least one user identified by the broadcaster to join the merged live content stream as co-broadcaster, wherein the set of layered avatars are layered so that the first avatar partially covers the second avatar.

* * * * *